Jan. 12, 1943.　　J. O'D SHEPHERD　　2,307,965
PULSE REGENERATOR
Filed July 12, 1941　　2 Sheets-Sheet 1
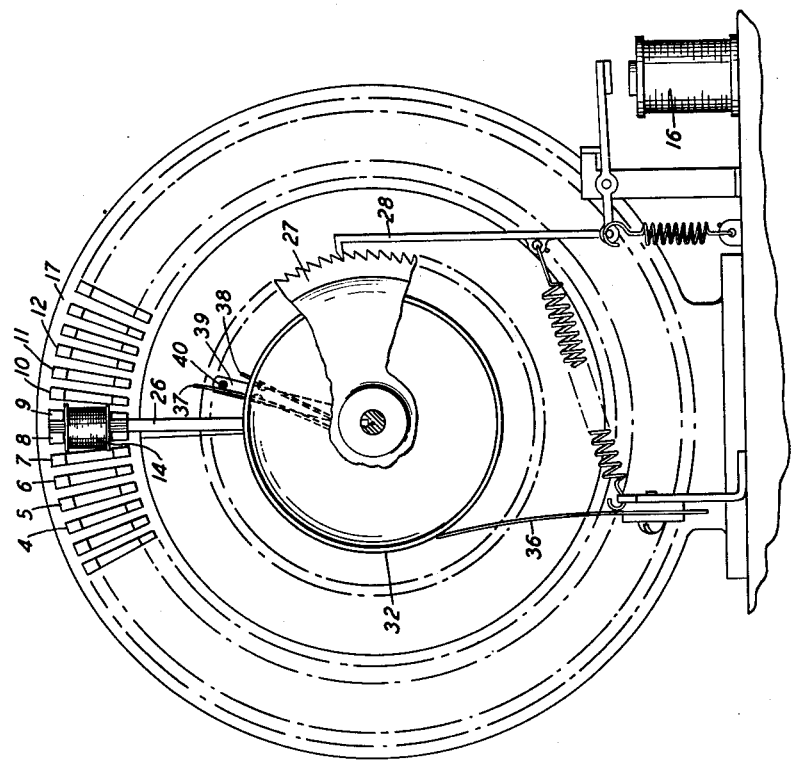
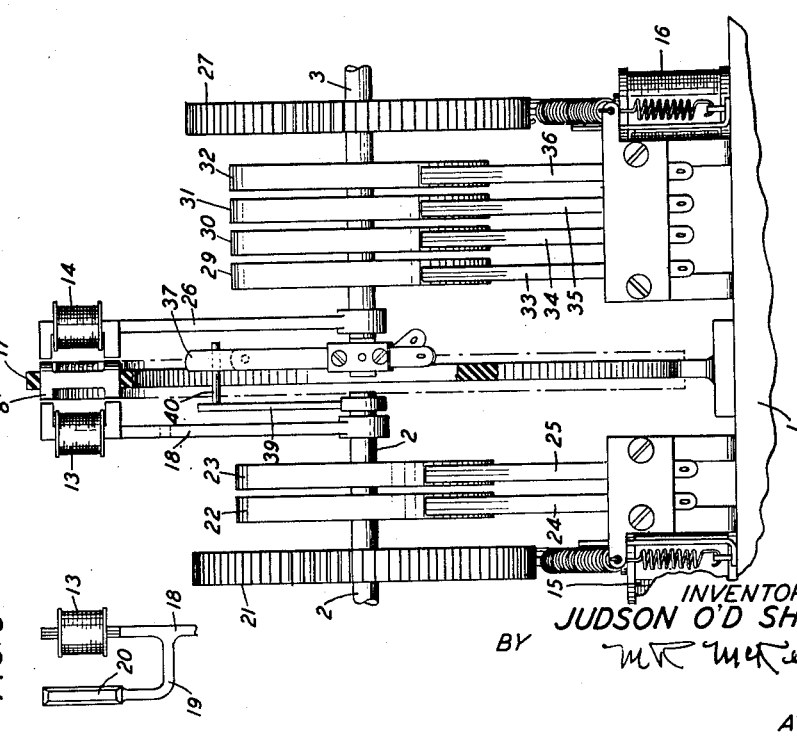
INVENTOR
JUDSON O'D SHEPHERD
BY
ATTORNEY Jan. 12, 1943.  J. O'D SHEPHERD  2,307,965
PULSE REGENERATOR
Filed July 12, 1941  2 Sheets-Sheet 2

INVENTOR
JUDSON O'D SHEPHERD
BY
ATTORNEY

Patented Jan. 12, 1943

2,307,965

UNITED STATES PATENT OFFICE 2,307,965

PULSE REGENERATOR

Judson O'D. Shepherd, Atlanta, Ga.

Application July 12, 1941, Serial No. 402,135

15 Claims. (Cl. 177—380)

This invention relates to signaling systems and particularly to pulse regenerators used in communication systems.

The object of the invention is to provide simple and economical means for relaying signaling pulses regenerated so as to be correct in strength, length and timing. Such means are particularly useful in telephone systems where dialing pulses may be mutilated by the length and condition of long lines. Means of this nature may be used at an intermediate point in a long line where the incoming pulses may not be seriously mutilated but would be if they traversed the entire length of the line, and where simple relay repeating means would be inadequate since such means have no correcting action but would tend to aggravate any mutilation.

In accordance with this invention a field of magnetizable elements are provided. Incoming pulses cause a magnet to sweep over this field and to magnetize the last of such elements encountered at the end of a train of pulses. Then a detector is caused to sweep over this same field, controlling the generation and transmission of out-pulses until the magnetized element is encountered whereupon the generation and transmission of such out-pulses is halted by the firing of a gas tube. Such gas tube is fired by an impulse generated by a magnetic coil in which the said magnetized element induces a potential of proper magnitude and direction.

A feature of the invention is a detector comprising a magnetizable coil normally positioned between two of such magnetizable elements whereby the detection is accomplished not by moving the detector into physical juxtaposition with the said magnetizable element but rather by moving said detector swiftly past such element.

Another feature of the invention resides in the shape of the pole-pieces of the magnetizable element and the detector whereby the impulse of the proper direction will be of sufficient magnitude only when such magnetizable element is magnetized in the proper direction. It will be realized that when a detector or pick-up coil is passed a magnetized point that an impulse first in one direction and then an impulse in the other direction is generated. By shaping the pole-pieces in the proper way the induced impulse upon the approach may be made of a considerably different value than the induced impulse on the departure therefrom. Hence by making the approach effectively gradual and the departure effectively precipitate the said gas tube may be accurately controlled.

Another feature of this invention is the use of a condenser discharge circuit for energizing the coil which energized the magnetizable element which is to define the number of pulses in an incoming train. By use of such means sufficient magnetization may be secured at low cost and with sufficient speed.

Other features will appear in the following description.

The drawings consist of two sheets having six figures as follows:

Figure 1 is an end view of an assembly of the essential elements of the present invention;

Fig. 2 is a side view of the same;

Fig. 5 is a fragmentary side view of the in-pulse arm showing the position and the manner of mounting the wipe-out magnet.

In the following description it will be understood that the essential elements of the invention and their cooperative relationship is shown but that no attempt is made to picture the appearance of the device in its commercial form. The frame on which the various parts are mounted is only indicated in fragmentary form and it will be understood that other parts are properly secured thereto in order to preserve the spacial relationship indicated. For instance it will be understood that proper means are provided to secure the shafts 2 and 3 to the frame 1, so that hereinafter in the absence of specific description thereof proper supports for each element will be assumed.

The device consists essentially of a field of magnetizable elements, 4 to 12 inclusive, by way of example, arranged to be influenced by a magnetizing coil 13 and later searched over by a detector coil 14. The magnetizing coil 13 is arranged to sweep over the field in response to incoming trains of impulses and to magnetically affect the last of a number of elements corresponding to the number of pulses in a train. The detector coil 14 then steps around and is halted when it detects an affected magnetic element, the number of steps being counted and a regenerated pulse transmitted for each such step so that the number of out-pulses corresponds exactly to the number of in-pulses.

Figure 4:
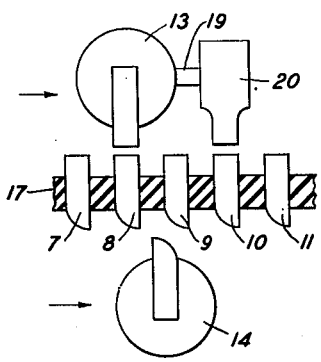
Fig. 4 is a fragmentary detailed top view of the apparatus illustrating the relative normal positions of the permanent magnet, the energizing in-pulse magnet and the detector magnet.

The field of magnetizable elements consists essentially of an annulus 17 of insulating or non-magnetic material in which the magnetic elements 4 to 12 are secured or embedded at regular intervals. These magnetic elements are of permanent magnetic material and will retain sufficient magnetism to perform the duties assigned to them. The in-pulse arm 18 has mounted on its extremity a magnetizing coil 13 which will, under conditions to be described hereinafter, reverse the normal polarization of the elements. Also mounted on the end of the arm 18 is an extension 19 which carries a wipe-out magnet 20 which as indicated in Fig. 4 precedes the magnet 13 and acts to return the polarization of any reversed elements to normal. It will be understood that the wipe-out magnet 20 although here shown as a permanent magnet may also be in the form of an electromagnet energized only during the time this apparatus is in use.

Each magnetizable element such as that numbered 8 in Fig. 1 consists of a main body portion and a pair of poles, one pair for cooperation with the magnet 13 and the other pair for cooperation with the detector coil 14. The first pair are square ended so as to have the maximum benefit from association with the poles of the magnet 13. The other pair are shaped for a special purpose. The detector coil 14, as indicated in Fig. 4 comes to rest in a position half-way between two magnetizable elements and each stepping movement thereof consists of a sweeping movement past a magnetizable element with maximum speed occurring as the poles of the detector coil leave the poles of the element. It will be realized that as the detector coil sweeps past an element that a double impulse will be induced in the coil, one part being in one direction on the approach to and another part being in the opposite direction on the departure from the element. Due to the shaping of the polepieces these two impulses may be of greatly different magnitudes. Since the circuit which responds to the detector coil will only respond to an impulse in a given direction and of a given magnitude, it may be made unresponsive to any impulse induced from a normally poled element and responsive to a reversed element.

The arm 18 is secured to a shaft 2 which is moved by a ratchet wheel 21 secured thereto and driven by a pawl controlled by the in-pulse magnet 15. A pair of slip rings 22 and 23 cooperating with brushes 24 and 25 serve to make electrical connections between the coil 13 and the stationary part of the circuit. For the sake of clarity the electrical connections between the coil 13 and the slip rings have been omitted. Likewise similar electrical connections between the coil 14, the overtake switch springs 37 and 38 and the slip rings 24 to 32 have been omitted in the showing.

The out-pulse arm 26 which carries the detector coil 14 is secured to a shaft 3 which is moved by a ratchet wheel 27 secured thereto and driven by a pawl 28 controlled by the out-pulse magnet 16. A set of slip rings 29, 30, 31 and 32 cooperating with brushes 33, 34, 35 and 36, respectively, serve to make electrical connections between the coil 14 and the overtake switch and the stationary part of the circuit.

The overtake switch consists of a pair of contacts 37 and 38 suitably insulated from each other and secured to the shaft 3. They are shown in Fig. 3 in their normal position as when the coils 13 and 14 are in the positions indicated in Fig. 4.

An arm 39, secured to the shaft 2, carries a pin 40 of insulating material against which the spring 37 will come to rest and thus open the circuit between springs 37 and 38.

Figure 3:
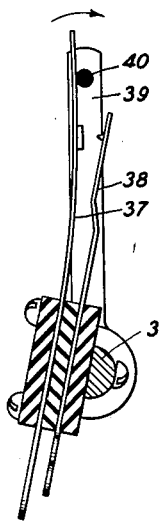
Fig. 3 is a fragmentary detailed view of the overtake switch.

When a train of incoming impulses are being registered the arm 39 will move in a clockwise position (as shown in Figs. 2 and 3) and upon the first step will allow the circuit between springs 37 and 38 to become closed. This will constitute a signal for the out-pulse portion of the device to go into action.

Figure 6:
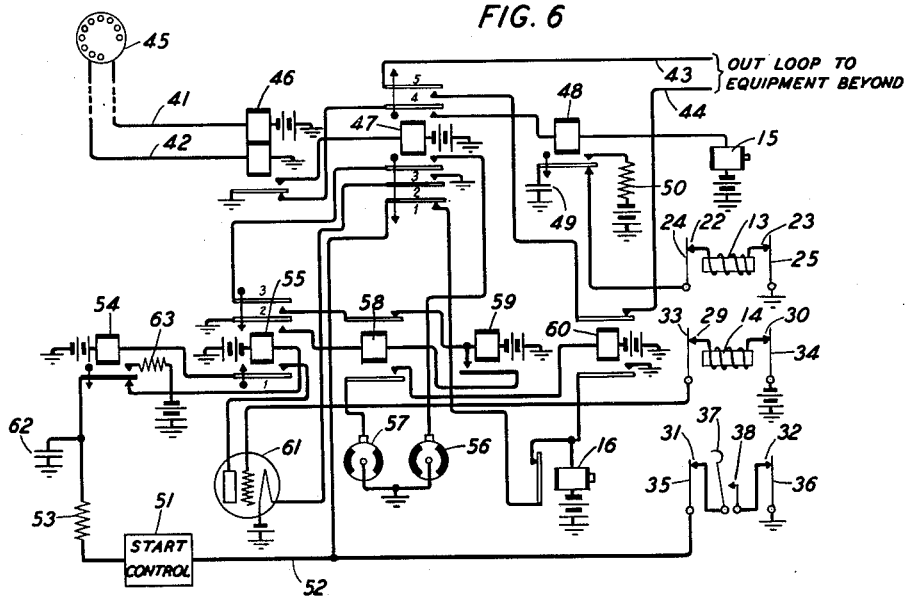
Fig. 6 is a circuit diagram showing the necessary connections for the operation of the device.

The operation of the device may be followed by the description of the circuit diagram, Fig. 6. When used as a simple pulse regenerator the conductors 41 and 42 constitute the input terminals and the conductors 43 and 44 constitute the output terminals. A dial 45 represents a substation or other impulse transmitter and when the line is taken into use the relay 46 will be energized. A train of pulses sent by the dial 45 will result in short periodic releases of the relay 46 corresponding in number to the number of impulses in the train.

When relay 46 becomes energized the first slow release relay 47 responds and remains energized until a prolonged release of relay 46 occurs. During the transmission of impulses each pulse closes a circuit from ground, the armature and back contact of relay 46, the armature 4 and front contact of relay 47, the winding of the second slow release relay 48 and the winding of in-pulse magnet 15 to battery. The magnet 15 responds to each pulse separately and the second slow relay 48 responds to the train of impuses as a whole. The magnet 15 steps the arm 18 around a corresponding number of steps and brings the energizer 13 into cooperative relationship with that one of the magnetizable elements corresponding in number beyond the starting position thereof to the number of impulses in the train.

During the receipt of the impulses and the consequent energization of relay 48 a circuit is closed from ground, condenser 49, armature and front contact of relay 48, resistance 50 to battery through which condenser 49 is charged. After the whole train of pulses has been registered relay 48 releases and condenser 49 is then connected to the winding of the energizer coil 13. The condenser discharge is sufficient to cause the polarization of the magnetizable element before which the coil 13 is stationed to be reversed.

Thereafter other trains of impulses may be registered in the same manner.

Upon the first step of the in-pulse arm 18 the circuit through the overtake switch contacts 37 and 38 is closed. It will be noted that this circuit passes through a rectangle 51 labeled "start control." If this apparatus is used as a simple pulse regenerator and it is wished to send the out-pulses soon after the in-pulses have started to come in then this auxiliary control may be omitted. However, there may be cases where the starting of the out-pulse operations are to be delayed and so this rectangle 51 indicates any well-known means of this nature. By way of example this start control circuit may be operated after one or more digits have been transmitted to introduce an extra delay before continuation of out-pulsing as may be required in some applications of this device.

Upon the connection of ground to conductor 52, a circuit is closed through resistance 53, the armature and back contact of relay 54, winding of relay 55 to battery. Relay 55 is slow to operate so it will not move its armatures until after a short time interval has passed. Thereupon a circuit is closed from ground, interrupter 56, front contact and armature 3 of relay 47, armature 3 and front contact of relay 55, upper armature and back contact of relay 58, winding of relay 59 to battery. It will be noted that interrupters 56 and 57 are on the same shaft and rotate together. Interrupter 56 is arranged to close a circuit therethrough for the same or a slightly longer period than through interrupter 57 and at the same time. This is for the purpose of preventing the out-pulse relay 60 from ever being operated for a fractional part of a period. Relay 59 becomes operated if at the time relay 55 is operated the circuit through interrupter 56 is closed, or on the first closure of such circuit thereafter. Relay 59 then closes a circuit through its front contact and armature, the winding of relay 58, the front contact and armature 2 of relay 55 to ground but since ground is now connected to the front contact of relay 59 from interrupter 56, relay 58 does not operate. At the end of the circuit closure through interrupter 56, the original energizing circuit for relay 59 is opened but relays 58 and 59 being now in series, relay 59 remains operated and relay 58 operates. Relay 58 opens the circuit from the interrupter 56 to relay 59 and closes the circuit from interrupter 57 to out-pulse relay 60.

Now upon the next closure of the circuit through interrupter 57, relay 60 will be operated. This relay opens the out-pulse circuit from conductor 44, back contact and upper armature of relay 60, front contact and armature 5 of relay 47 to conductor 43. This regenerated pulse will be of proper length due to the design and operation of interrupter 57. Relay 60 also closes a circuit from ground, front contact and lower armature of relay 60, winding of out-pulse magnet 16 to battery, and this magnet causes the detector coil 14 to sweep past the first of the magnetizable elements passed over by the energizer coil 13. This action is repeated until exactly the same number of steps have been taken as there were impulses in the incoming train. On the last of these steps the detector coil 14 will have induced in its windings a pulse of the proper sign and strength to trip off the tube 61 which thereupon sets up an anode current great enough to operate the relay 54, and this current will continue to flow until the plate circuit of tube 61 is broken. Relay 54 becoming energized causes the release of relay 55 and this in turn releases relay 58 and 59 and the former opens the circuit between interrupter 57 and relay 60 so that out-pulsing is stopped and further operation of out-pulse magnet 16 is halted.

Relay 55 in releasing also opens the circuit of relay 54 and the plate circuit of the tube 61. Relay 54 is slow to release so it does not again close the circuit of relay 55 for a definite interval. Also during the operation of relay 54 the condenser 62 was charged through the resistance 63 so that its discharge further delays the operation of relay 55. The time interval between the operation of relay 54 and the next operation of relay 55 as controlled by the slow releasing characteristic of relay 54 and the discharge of condenser 62 through resistance 53 constitutes the interdigit pause and may be accurately controlled.

If the in-pulsing has been slow or if only one train of pulses has been registered then upon the completion of the transmission of this train of out-pulses the overtake switch will be opened and no more out-pulse operations will take place until the pin 40 is moved on, since the discharge path for condenser 62 through resistance 53 will be open.

If the in-pulsing has continued then at the completion of the above-described out-pulse operation, the contacts 37 and 38 will still be closed and upon the following energization of relay 55 another out-pulsing operation will take place.

Should a subscriber abandon a connection at any time before the out-pulse arm has caught up to the impulse arm then a circuit will be established from ground through the overtake switch contacts 37 and 38, armature 1 and back contact of relay 47, armature and back contact of out-pulse magnet 16, the winding thereof to battery whereby the out-pulse arm is automatically stepped forward to the position where the coils 13 and 14 are in the positions indicated in Fig. 4, whereupon the overtake contacts are opened.

What is claimed is:

1. A device comprising a plurality of magnetizable elements, an energizer arranged to be associated with each of said elements in turn, means responsive to a train of incoming pulses for moving said energizer from association with one of said elements to another in accordance with the number of pulses in a said train, means responsive to the association of said energizer with that one of said elements designating the number of pulses in the said train for magnetizing said element, a detector for detecting a magnetized element, means for moving said detector past said elements one at a time, means responsive thereto for generating and transmitting an outgoing pulse for each said element passed and means responsive to the detection of a said magnetized element for halting the action of said detector and terminating the transmission of said outgoing pulses.

2. A device comprising a plurality of magnetizable elements, an energizer arranged to be associated with each of said elements in turn, means responsive to a train of incoming pulses for moving said energizer from association with one said element to another in accordance with the number of pulses in a said train, means responsive to the termination of a train of incoming pulses for operating said energizer to magnetize that one of said elements designating the number of pulses in the said train, a detector for detecting a magnetized element, means for moving said detector past said elements one at a time, means responsive thereto for generating and transmitting an outgoing pulse for each said element passed and means responsive to the detection of a said magnetized element for halting the action of said detector and terminating the transmission of said outgoing pulses.

3. A device comprising a plurality of magnetizable elements, an energizer operative to magnetize an element with which it is associated, means for advancing the energizer into association with the elements in order in response to impulses received in a train, means responsive to the termination of the train of impulses for causing the energizer to magnetize the element with which it is then associated, a detector, means for transmitting impulses, means controlled by last said means for advancing the detector along the elements in like order, the advance of the detector past each element corresponding to a transmitted impulse and means controlled by the detector in response to the detector being advanced past the element magnetized by the energizer for terminating the transmission of impulses.

4. A device comprising a plurality of magnetizable elements, an energizer arranged to be closely associated with each of said elements in turn, means responsive to a train of incoming pulses for moving said energizer from association with one said element to another in accordance with the number of pulses in a said train, means responsive to the association of said energizer with that one of said elements designating the number of pulses in the said train for magnetizing said element, a detector for detecting a magnetized element, means for moving said detector past said elements one at a time, said detector at rest being positioned midway between two of said elements, means controlled by said last means for generating and transmitting an outgoing pulse for each said element passed and means responsive to the detection of a said magnetized element for halting the action of said detector and terminating the transmission of said outgoing pulses.

5. A device comprising a plurality of magnetizable elements, an energizer arranged to be associated with each of said elements in turn, means responsive to a train of incoming pulses for moving said energizer from association with one said element to another in accordance with the number of pulses in a said train, a slow releasing relay responsive to a train of incoming pulses as a unit, means responsive to the release of said relay for operating said energizer to magnetize that one of said elements designating the number of pulses in the said train, a detector for detecting a magnetized element, means for moving said detector past said elements one at a time, means responsive thereto for generating and transmitting an outgoing pulse for each said element passed and means responsive to the detection of a said magnetized element for halting the action of said detector and terminating the transmission of said outgoing pulses.

6. A device comprising a plurality of magnetizable elements, an energizer arranged to be associated with each of said elements in turn, means responsive to a train of incoming pulses for moving said energizer from association with one said element to another in accordance with the number of pulses in a said train, a slow releasing relay responsive to a train of incoming pulses as a unit, a condenser charged by the operation of said slow releasing relay, means responsive to the release of said relay for discharging said condenser through said energizer to magnetize that one of said elements designating the number of pulses in the said train, a detector for detecting a magnetized element, means for moving said detector past said elements one at a time, means responsive thereto for generating and transmitting an outgoing pulse for each said element passed and means responsive to the detection of a said magnetized element for halting the action of said detector and terminating the transmission of said outgoing pulses.

7. A device comprising a plurality of magnetizable elements, an energizer arranged to be closely associated with each of said elements in turn, means responsive to a train of incoming pulses for moving said energizer from association with one of said elements to another in accordance with the number of pulses in said train, means responsive to the termination of a train of incoming pulses for operating said energizer to magnetize that one of said elements designating the number of pulses in the said train, a detector for detecting a magnetized element, said detector consisting of a coil so mounted as to become interlinked with a magnetic circuit including said magnetized element when placed in close association with said element, means for moving said detector past said elements one at a time whereby during said moving the transient interlinkage of said coil and the said magnetic circuit will create an induced pulse in said coil, means controlled by said last means for generating and transmitting an outgoing pulse for each said element passed and means responsive to said induced pulse for halting the action of said detector and terminating the transmission of said outgoing pulses.

8. A device comprising a plurality of magnetizable elements, an energizer arranged to be closely associated with each of said elements in turn, means responsive to a train of incoming pulses for moving said energizer from association with one of said elements to another in accordance with the number of pulses in a said train, means responsive to the termination of a train of incoming pulses for operating said energizer to magnetize that one of said elements designating the number of pulses in the said train, a detector for detecting a magnetized element, said detector consisting of a coil so mounted as to become interlinked with a magnetic circuit including said magnetized element when placed in close association with said element, means for moving said detector past said elements one at a time whereby during said movement the transient interlinkage of said coil and the said magnetic circuit will create an induced pulse in said coil in one direction upon the approach to said transient interlinkage and an induced pulse in said coil in the other direction upon the departure from said transient interlinkage, means controlled by said last elements for generating and transmitting an outgoing pulse for each said element passed and a circuit arrangement including means responsive to said pulse induced in said detector coil upon the said departure from said transient interlinkage for halting the action of said detector and terminating the transmission of said outgoing pulses.

9. A device comprising a plurality of magnetizable elements, an energizer arranged to be closely associated with each of said elements in turn, means responsive to a train of incoming pulses for moving said energizer from association with one of said elements to another in accordance with the number of pulses in a said train, means responsive to the termination of a train of incoming pulses for operating said energizer to magnetize that one of said elements designating the number of pulses in the said train, a detector for detecting a magnetized element, said detector consisting of a coil so mounted as to become interlinked with a magnetic circuit including said magnetized element when placed in close association with said element, means for moving said detector past said elements one at a time whereby during moving the transient interlinkage of said coil and the said magnetic circuit will create an induced pulse in said coil in one direction upon the approach to said transient interlinkage and an induced pulse in said coil in the other direction upon the departure from said transient interlinkage, the elements of said transiently established magnetic circuit being so arranged that the said pulse induced in said coil upon the approach to said transient interlinkage will be of lesser magnitude than the said pulse induced in said coil upon the departure from said transient interlinkage, means controlled by the means for moving said detector for generating and transmitting an outgoing pulse for each said element passed and a circuit arrangement including means responsive to said pulse induced in said detector coil upon the said departure from said transient interlinkage for halting the action of said detector and terminating the transmission of said outgoing pulses.

10. A device comprising a plurality of magnetizable elements, an energizer arranged to be closely associated with each of said elements in turn, means responsive to a train of incoming pulses for moving said energizer from association with one of said elements to another in accordance with the number of pulses in a said train, means responsive to the association termination of a train of incoming pulses for operating said energizer to magnetize that one of said elements designating the number of pulses in the said train, a detector for detecting a magnetized element, said detector consisting of a coil so mounted as to become interlinked with a magnetic circuit including said magnetized element when placed in close association with said element, means for moving said detector past said elements one at a time whereby during said movement the transient interlinkage of said coil and the said magnetic circuit will create an induced pulse in said coil in one direction upon the approach to said transient interlinkage and an induced pulse in said coil in the other direction upon the departure from said transient interlinkage, each said element having a pair of pole-pieces, said detector coil being mounted on a magnetizable element having a pair of pole-pieces, said pole-pieces being so shaped that the said pulse induced in said coil upon the approach to said transient interlinkage will be of less magnitude than the said pulse induced in said coil upon the departure from said transient interlinkage, means for generating and transmitting an outgoing pulse for each said element passed and a circuit arrangement including means responsive to said pulse induced in said detector coil upon the said departure from said transient interlinkage for halting the action of said detector and terminating the transmission of said outgoing pulses.

11. A device comprising a plurality of magnetizable elements, an energizer arranged to be closely associated with each of said elements in turn, means responsive to a train of incoming pulses for moving said energizer from association with one of said elements to another in accordance with the number of pulses in a said train, means responsive to the termination of a train of incoming pulses to operate said energizer to magnetize that one of said elements designating the number of pulses in the said train, a detector for detecting a magnetized element, said detector consisting of a coil so mounted as to become interlinked with a magnetic circuit including said magnetized element when placed in close association with said element, means for moving said detector past said elements one at a time whereby during said movement the transient interlinkage of said coil and the said magnetic circuit will create an induced pulse in said coil in one direction upon the approach to said transient interlinkage and an induced pulse in said coil in the other direction upon the departure from said transient interlinkage, each said element having a pair of pole-pieces, said detector coil being mounted on a magnetizable element having a pair of pole-pieces, said pole-pieces being so shaped that upon approach to a magnetized element the said interlinkage is comparatively gradual and upon departure the said interlinkage is comparatively precipitate, means for generating and transmitting an outgoing pulse for each said element passed and a circuit arrangement including means responsive to said pulse induced in said detector coil upon the said departure from said transient interlinkage for halting the action of said detector and terminating the transmission of said outgoing pulses.

12. A device comprising a plurality of magnetizable elements, an energizer arranged to be closely associated with each of said elements in turn, said energizer consisting of a coil so disposed as to be interlinked with a magnetic circuit including one of said magnetizable elements when in close association therewith, means responsive to a train of incoming pulses for moving said energizer from association with one of said elements to another in accordance with the number of pulses in said train, means responsive to the termination of a train of incoming pulses for operating said energizer to magnetize that one of said elements designating the number of pulses in the said train, a detector for detecting a magnetized element, means for moving said detector past said elements one at a time, said detector at rest being positioned midway between two of said elements, means for generating and transmitting an outgoing pulse for each said element passed and means responsive to the detection of a said magnetized element for halting the action of said detector and terminating the transmission of said outgoing pulses.

13. A device comprising a plurality of elements normally magnetized in one direction, an energizer arranged to be closely associated with each of said elements in turn, means responsive to a train of incoming pulses for moving said energizer from association with one of said elements to another in accordance with the number of pulses in a said train, means responsive to the termination of a train of incoming pulses to operate said energizer to reverse the magnetism of that one of said elements designating the number of pulses in the said train, a detector for detecting a magnetically reversed element, said detector consisting of a coil so mounted as to become interlinked with a magnetic circuit including a magnetized element when placed in close association therewith, means for moving said detector past said elements one at a time whereby during said movement the transient interlinkage of said coil and the said magnetic circuit will create an induced pulse in said coil, means for generating and transmitting an outgoing pulse for each said element passed and a circuit arrangement responsive to an induced pulse from a said magnetically reversed element for halting the action of said detector and terminating the transmission of said outgoing pulses.

14. A device comprising a plurality of elements normally magnetized in one direction, an energizer arranged to be closely associated with each of said elements in turn, means responsive to a train of incoming pulses for moving said energizer from association with one of said elements to another in accordance with the number of pulses in a said train, means responsive to the termination of a train of incoming pulses to operate said energizer to reverse the magnetism of that one of said elements designating the number of pulses in the said train, a detector for detecting a magnetically reversed element, said detector consisting of a coil so mounted as to become interlinked with a magnetic circuit including a magnetized element when placed in close association therewith, means for moving said detector past said elements one at a time whereby during said movement the transient interlinkage of said coil and the said magnetic circuit will create an induced pulse in said coil, means for generating and transmitting an outgoing pulse for each said element past a circuit arrangement responsive to an induced pulse from a said magnetically reversed element for halting the action of said detector and terminating the transmission of said outgoing pulses and means preceding said energizer for restoring any magnetically reversed element encountered to its normal state.

15. A device comprising a plurality of magnetizable elements, an energizer arranged to be closely associated with each of said elements in turn, means responsive to trains of incoming pulses for moving said energizer past a number of said elements corresponding to the number of pulses in said trains, means responsive to the termination of a train of incoming pulses to operate said energizer to magnetize that one of said elements designating the number of pulses in the said train, a detector for detecting a magnetized element, means for moving said detector past said elements one at a time, means responsive thereto for generating and transmitting an outgoing pulse for each said element passed and means responsive to the detection of a said magnetized element for halting the action of said detector and terminating the transmission of said outgoing pulses for a predetermined period.

JUDSON O'D. SHEPHERD.